(12) United States Patent
Backman

(10) Patent No.: US 10,549,686 B2
(45) Date of Patent: Feb. 4, 2020

(54) LIGHT BAR FOR A MOTOR VEHICLE

(71) Applicant: GM GLOBAL TECHNOLOGY OPERATIONS LLC, Detroit, MI (US)

(72) Inventor: Fredrik Backman, Frankfurt am Main (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 112 days.

(21) Appl. No.: 15/843,217

(22) Filed: Dec. 15, 2017

(65) Prior Publication Data

US 2018/0170252 A1 Jun. 21, 2018

(30) Foreign Application Priority Data

Dec. 16, 2016 (DE) .................... 20 2016 007 620 U

(51) Int. Cl.
*B60Q 3/30* (2017.01)
*B60Q 3/35* (2017.01)
*B60Q 3/51* (2017.01)
*B60Q 3/82* (2017.01)
*B60R 5/04* (2006.01)
*B60Q 3/50* (2017.01)
*B60Q 3/88* (2017.01)

(52) U.S. Cl.
CPC .................. *B60Q 3/30* (2017.02); *B60Q 3/35* (2017.02); *B60Q 3/50* (2017.02); *B60Q 3/51* (2017.02); *B60Q 3/82* (2017.02); *B60Q 3/88* (2017.02); *B60R 5/044* (2013.01)

(58) Field of Classification Search
CPC ... B60Q 3/30; B60Q 3/35; B60Q 3/51; B60Q 3/88; B60Q 3/82; B60R 5/044; B60R 5/045; B60R 5/047
See application file for complete search history.

(56) References Cited

U.S. PATENT DOCUMENTS

| | | | | |
|---|---|---|---|---|
| 4,044,482 A | * | 8/1977 | Mosch | B60Q 7/02 116/28 R |
| 5,432,689 A | * | 7/1995 | Sharrah | F21L 4/085 362/183 |
| 5,803,577 A | * | 9/1998 | Stratton | B60Q 1/2615 362/223 |
| 6,030,105 A | * | 2/2000 | Thau | B60Q 3/74 340/468 |

(Continued)

FOREIGN PATENT DOCUMENTS

| | | |
|---|---|---|
| DE | 4123136 | 1/1993 |
| DE | 29506772 | 9/1995 |

(Continued)

*Primary Examiner* — Gregory A Blankenship
(74) *Attorney, Agent, or Firm* — Lorenz & Kopf, LLP

(57) ABSTRACT

A light bar for a trunk of a motor vehicle includes a tubular element. The tubular element includes a straight or slightly curved bar forming an interior. One or more lamps are secured in the interior and/or on the shell surface of the tubular element. A first end of the tubular element is provided with an electrical plug connection, which is connected in an electrically conductive manner with the at least one lamp. The light bar is configured to be placed in the trunk of a motor vehicle, so that its electrical plug connection is connected with a corresponding plug connection in the trunk.

13 Claims, 6 Drawing Sheets

(56) References Cited

U.S. PATENT DOCUMENTS

| | | | | |
|---|---|---|---|---|
| 6,701,995 | B1* | 3/2004 | Bogdanski | B60R 5/047 16/111.1 |
| 9,440,590 | B1* | 9/2016 | Huelke | B60R 5/045 |
| 2004/0208013 | A1* | 10/2004 | Dalton, Jr. | B60Q 1/268 362/488 |
| 2006/0152936 | A1* | 7/2006 | Thomas | B60Q 1/0088 362/459 |
| 2009/0109696 | A1* | 4/2009 | Lembrick | B60Q 3/30 362/485 |
| 2009/0303739 | A1* | 12/2009 | Garcia | B60Q 3/85 362/496 |
| 2012/0195031 | A1* | 8/2012 | Li | F21L 4/085 362/183 |
| 2013/0250594 | A1* | 9/2013 | Baldsiefen | B60P 7/0815 362/496 |
| 2015/0251598 | A1* | 9/2015 | Andrews | B60Q 7/00 362/486 |
| 2017/0267168 | A1* | 9/2017 | Dylewski, II | B60Q 3/35 |
| 2018/0037161 | A1* | 2/2018 | Wymore | F21S 9/02 |
| 2018/0062407 | A1* | 3/2018 | Li | B60R 16/02 |
| 2018/0170252 | A1* | 6/2018 | Backman | B60Q 3/51 |
| 2019/0001875 | A1* | 1/2019 | Xu | B60Q 3/51 |

FOREIGN PATENT DOCUMENTS

| | | |
|---|---|---|
| DE | 10260984.5 | 8/2004 |
| DE | 102009010297.3 | 10/2009 |
| DE | 102015120007 | 5/2016 |

* cited by examiner

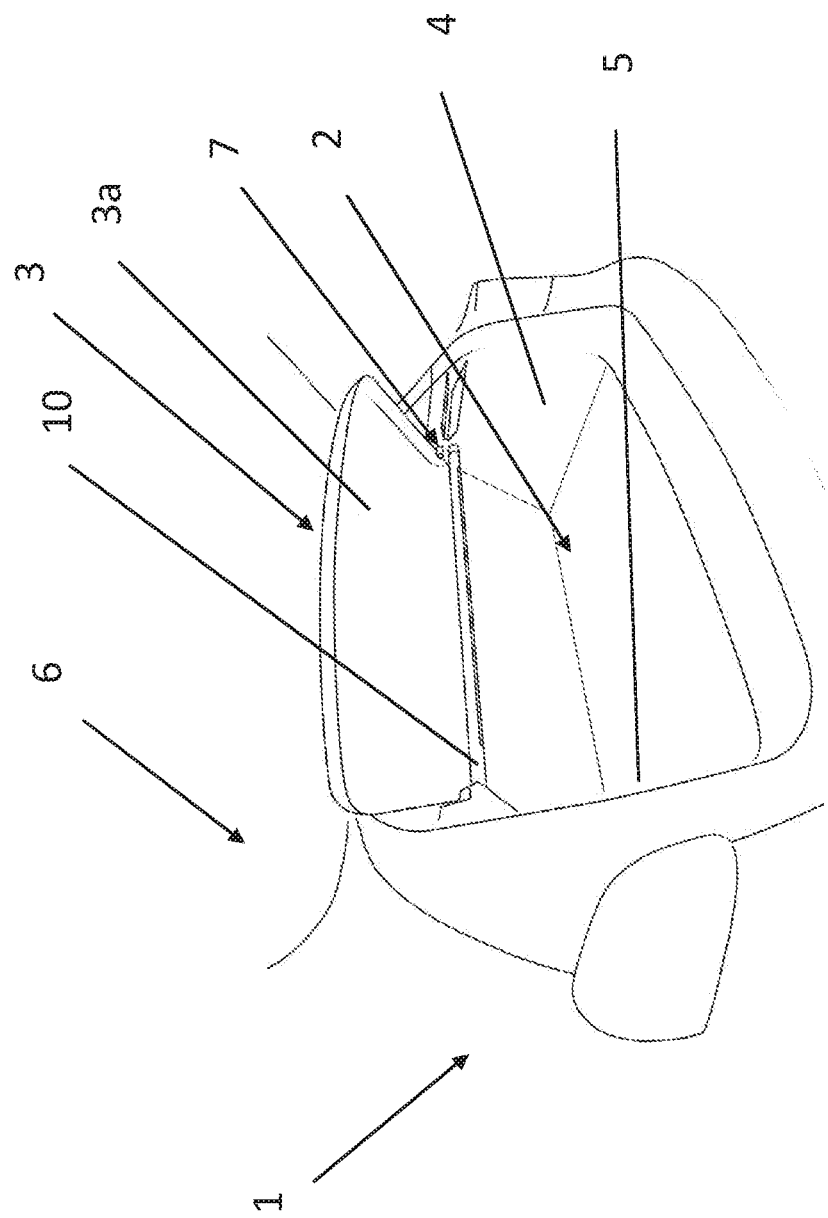

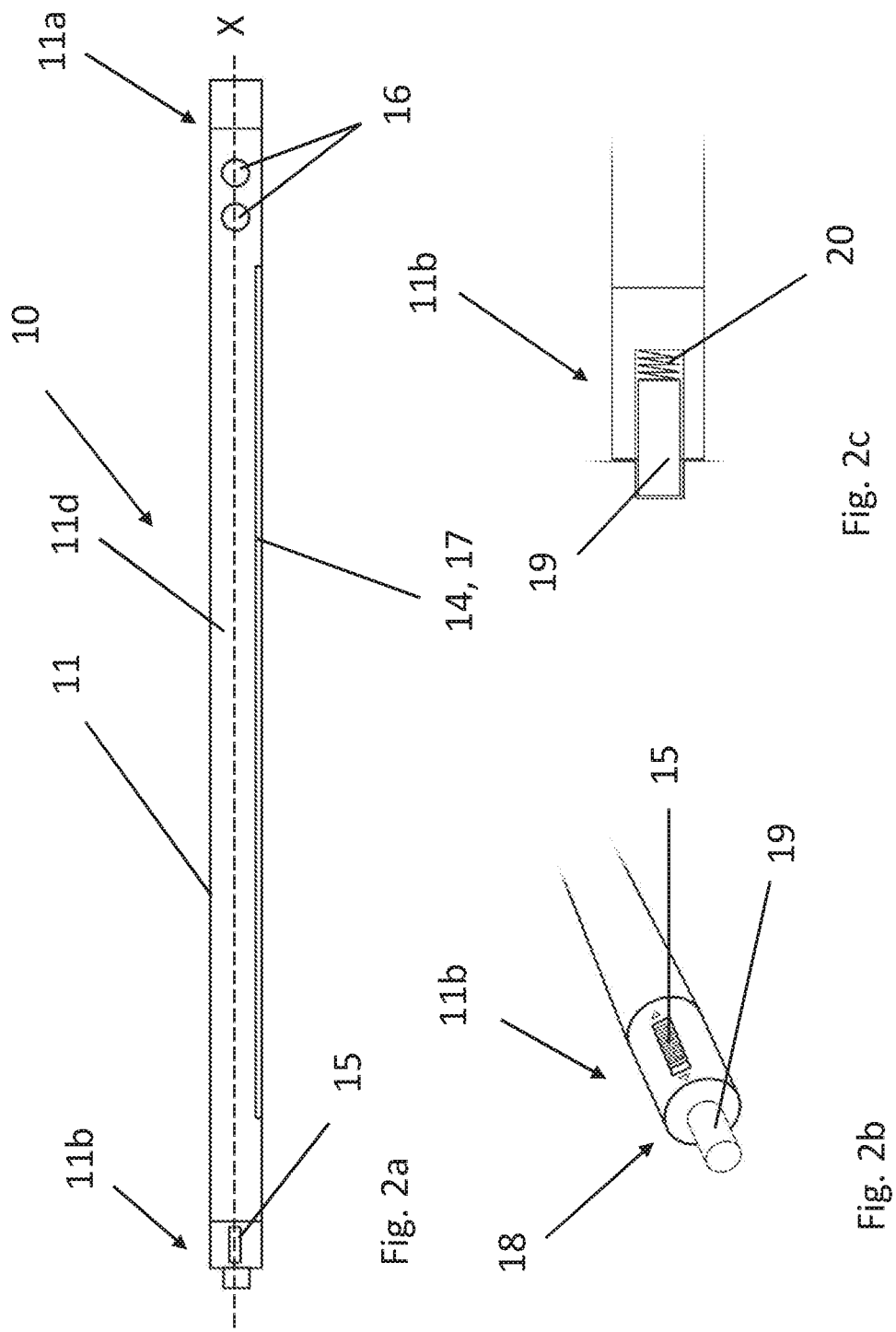

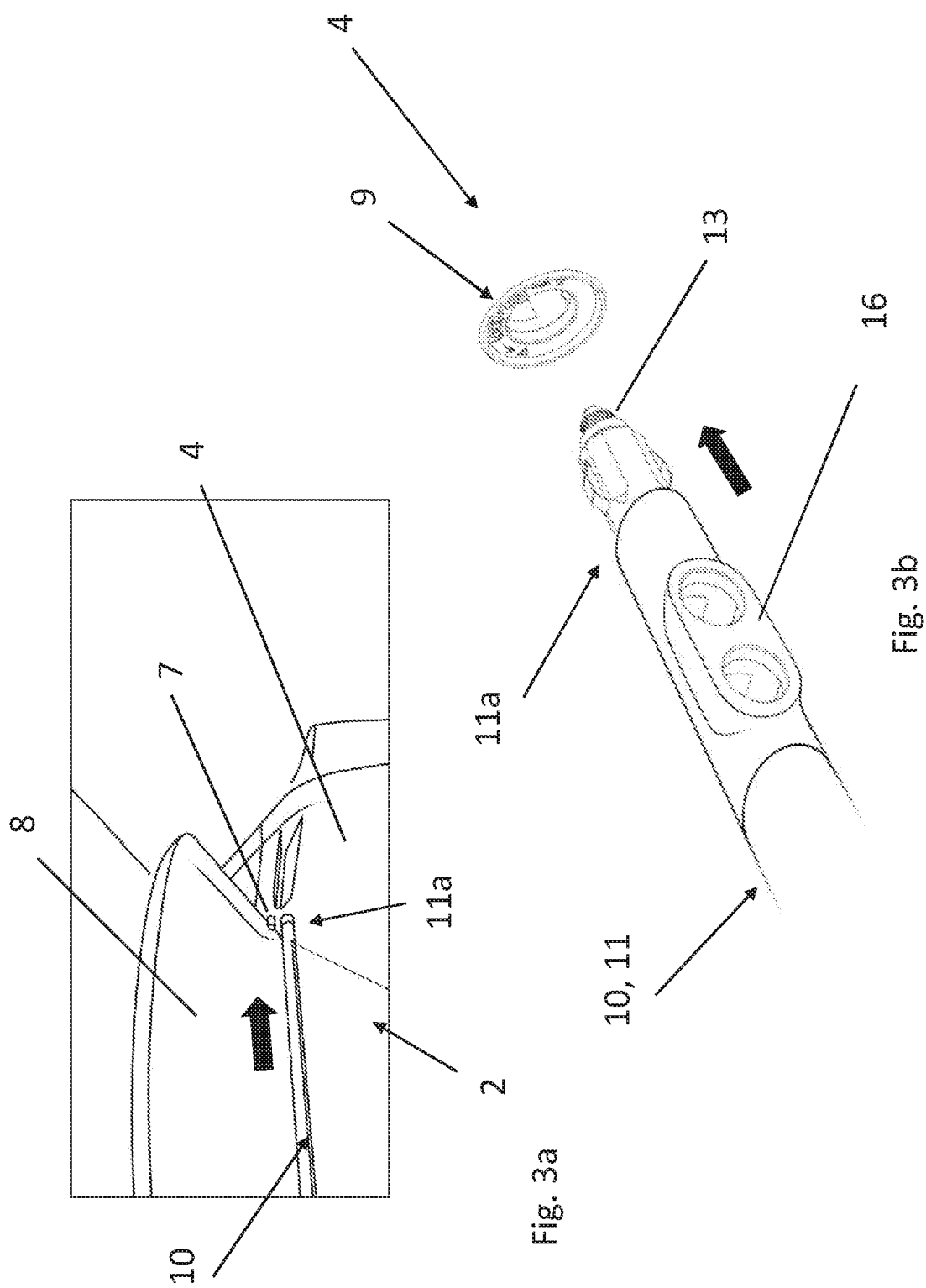

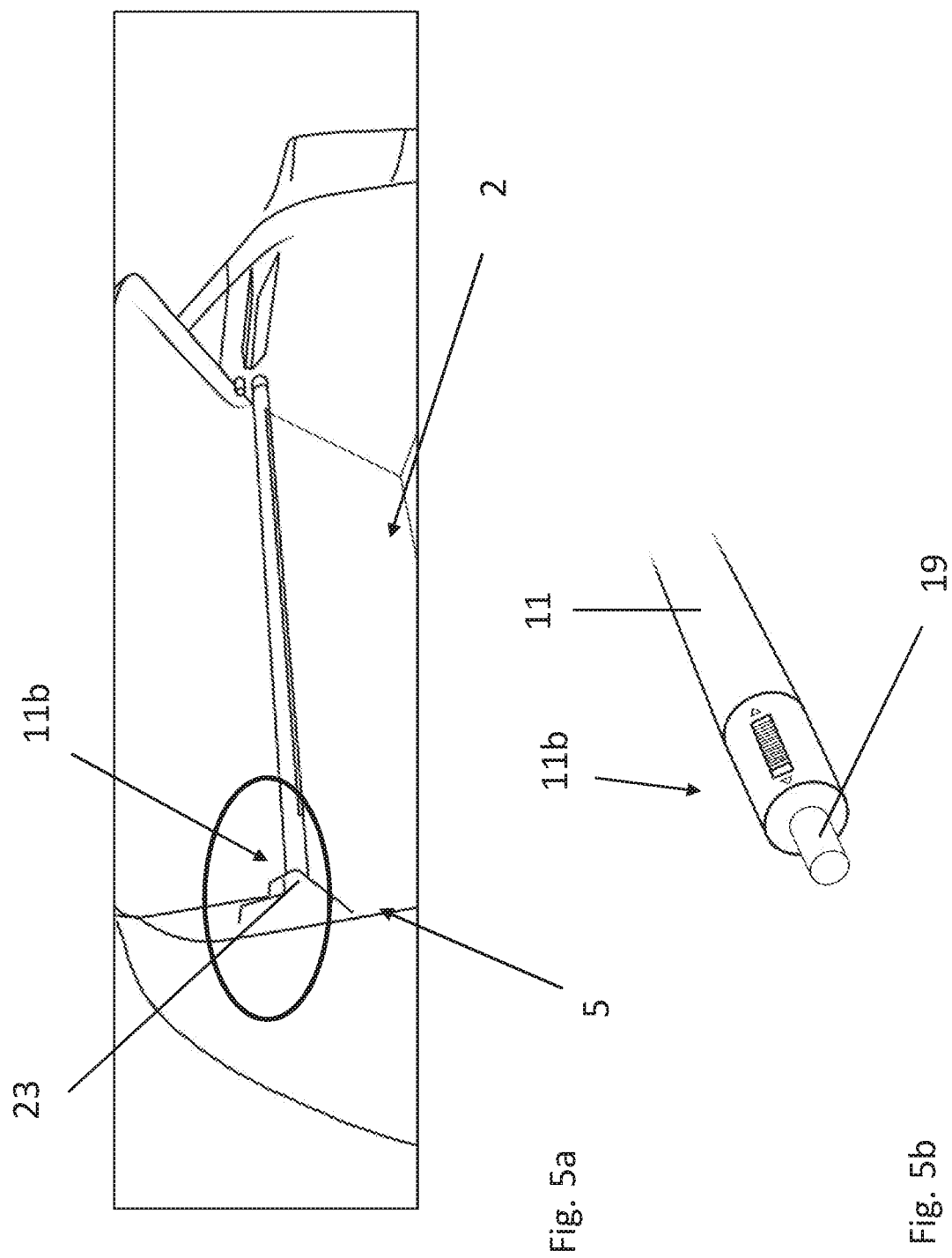

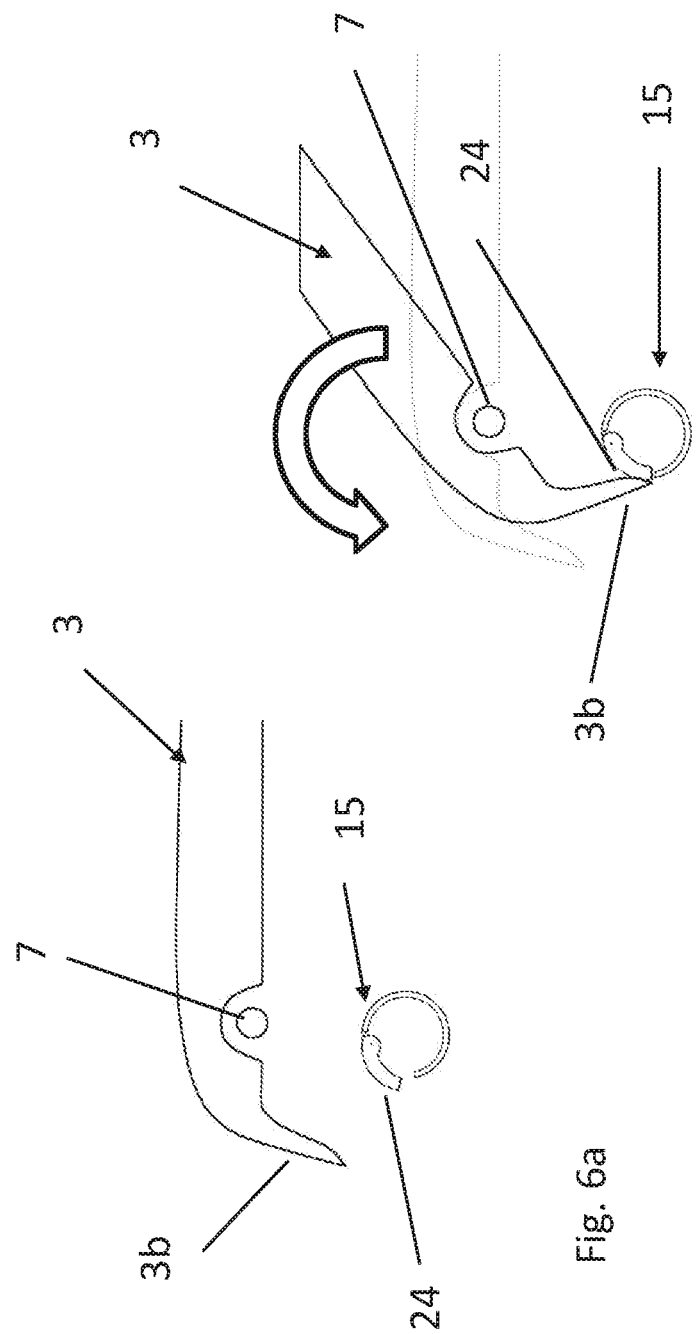

LIGHT BAR FOR A MOTOR VEHICLE

CROSS-REFERENCE TO RELATED APPLICATION

This application claims priority to German Patent Application No. 202016007620.6, filed Dec. 16, 2016, which is incorporated herein by reference in its entirety.

TECHNICAL FIELD

The present disclosure relates to a light bar for a motor vehicle, more precisely for a trunk of a motor vehicle, and to a motor vehicle with such a light bar.

BACKGROUND

The provision of sufficient lighting that can be used as needed for a motor vehicle presents a constant challenge to the automobile industry. In particular the illumination of a trunk often poses problems, since the latter is often deep and unfavorably tailored for complete illumination. In addition, the trunk is often provided with a parcel shelf or some other screen that further impedes the view, even with the trunk lid open.

Accordingly, there is a need for a light element that makes it possible to reliably illuminate the trunk of a motor vehicle that is flexible in use, and impedes the placement into and removal of luggage or other items as little as possible.

SUMMARY

According to embodiments of the present disclosure, a light bar for a trunk of a motor vehicle includes a tubular element with a first end and a second end, as well as of at least one lamp secured in an interior or on a shell surface of the tubular element, wherein the first end of the tubular element is provided with an electrical plug connection, which is connected in an electrically conductive manner with the at least one lamp.

The light bar according to the embodiments of the present disclosure is configured to be placed in the trunk of a motor vehicle, so that its electrical plug connection is connected with a corresponding plug connection of the trunk.

The tubular element includes a straight or slightly curved bar, the inside of which is at least partially hollow, thereby forming an interior. One or more lamps can be secured in this interior or also on the shell surface of the tubular element. There is enough space along the length of the tubular element to use the number of lamps required to completely illuminate the trunk.

Because an electrical plug connection is present for supplying the lamp(s) with electrical energy, the light bar can be detachably secured to a wall of the trunk and removed as needed. This means that the light bar can be flexibly used. If the electrical plug connection is a standardized connection, the light bar can also be used in a house, for example, so as to light up a room.

According to an embodiment of the light bar, the lamp is secured in the interior of the tubular element. A portion of the shell surface of the tubular element includes a translucent element. In this embodiment, the light generated by the lamp in the interior of the tubular element passes outwardly through the translucent element and into the trunk. The interior of the tubular element is thus outwardly sealed, so that no dust and contaminants can penetrate into the interior and impair the function of the lamp.

For example, the translucent element can be a lens, in particular a diffusion lens. As a result, the light generated in the interior of the tubular element is outwardly diffused, so that the trunk can be broadly illuminated. By contrast, if the lens is a converging lens, individual areas of the trunk can be specifically illuminated. Suitably selecting the number and shape of translucent elements and lamps makes it possible to achieve various lighting effects inside of the trunk.

In particular, the lamp can be a light-emitting diode. The latter are energy-efficient and small, so that they can also be used in tubular elements having a small diameter without complications.

In order to reliably secure the light bar in a trunk, the second end of the tubular element can be provided with a mechanical connector configured to establish a detachable connection. As opposed to the electrical plug connection of the first end, the mechanical connector is used exclusively for detachably fastening the light bar to a wall of the trunk of a motor vehicle.

For example, the mechanical connector can include a pin, which is mounted on the tubular element by a spring. In this way, a simple connector can be used to create a mechanical plug connection, which can quickly be released by hand. The light bar can thereby always be repeatedly placed in the trunk of the motor vehicle and removed from the latter in a simple manner.

A switching element can be secured to the shell surface of the tubular element for turning the lamp on and off In this way, the lamp can be manually actuated as required, for example. Thus, even when the plug connection of the light bar is connected with a voltage source and being supplied with electrical energy, power supply to the lamp can be interrupted, so that no electrical energy is consumed when the lamp is not in use.

In another embodiment of the light bar, at least one electrical connector is present on the shell surface of the tubular element, and connected in an electrically conductive manner with the electrical plug connection. In this embodiment, the light bar performs a dual function: It first serves to illuminate the trunk, while also being capable of supplying power to an additional electrical device. For example, a mobile phone, a portable computer or the like can be connected with the electrical connector while riding in the motor vehicle so as to charge the device.

As concerns the shape of the light bar in cross section, the tubular element can be circular or elliptical in design viewed in cross section. A light bar configured in this way can be readily gripped by hand and easily cleaned.

The versatility of the light bar according to the embodiments of the present disclosure can be further enhanced by having a rechargeable battery present in the interior of the tubular element, which is conductively connected with the at least one lamp. The rechargeable battery is used to store electrical energy, and can be charged when the electrical plug connection is connected with a power source. If the light bar is removed from the motor vehicle and the electrical plug connection is thus separated from the power source, the light source can still be used for lighting purposes for a certain period of time. There are numerous potential uses for such an embodiment. For example, the light bar can be used to illuminate a picnic area during a driving break, if the driving break takes place at twilight or in the dark. The light bar can also act as a replacement for a flashlight, for example if a tire of the motor vehicle has to be changed in the dark, or if other types of maintenance work is required on the motor vehicle.

As already mentioned, embodiments of the present disclosure also relate to a motor vehicle with a light bar according to one of the embodiments described above, wherein the motor vehicle has a trunk with a first side wall and a second side wall, wherein the first side wall is provided with an electrical plug connection, which is configured to interact with the electrical plug connection of the light bar.

The motor vehicle equipped with such a light bar offers the user a well illuminated trunk while taking up little space. When the light bar is placed in the trunk of the motor vehicle, the electrical plug connection of the light bar is connected with the corresponding electrical plug connection of the first side wall of the trunk of the motor vehicle through simple insertion. This creates a detachable, electrically conductive connection between the light bar and trunk of the motor vehicle. The electrical plug connection of the first side wall of the trunk can here be electrically connected with a battery integrated into the motor vehicle, for example a 12-volt battery, so as to thereby ensure power supply to the light bar.

When reference is made within the framework of the present disclosure to a "corresponding" electrical plug connection, this is intended to mean a plug connector complementary to the plug connector of the light bar. If the electrical plug connection of the light bar is a male plug, the corresponding electrical plug connection of the first side wall of the trunk is a matching receptacle or female socket. If the electrical plug connection of the light bar is conversely designed as a female socket, the corresponding electrical plug connection of the side wall of the trunk is a corresponding male plug.

The electrical plug connections preferably involve standardized electrical connectors, so that the light bar can also be used at other locations once removed from the trunk of the motor vehicle. The light bar is preferably dimensioned in such a way that, when inserted, it extends between a first side wall of the trunk to an opposite second side wall of the trunk, and is there potentially also mounted. The light bar may extend over an entire inner width of the trunk or spans the latter. As a result, the trunk can be uniformly illuminated.

In an embodiment, the motor vehicle equipped with the light bar has a parcel shelf, which is rotatably mounted on the first side wall and the second side wall of the trunk in such a way that pivoting the parcel shelf causes one end section of the parcel shelf to come into contact with the switching element of the tubular element of the light bar so as to actuate the switching element.

In this embodiment, the light bar is easily turned on automatically when the trunk is opened. This ensures that the user of the motor vehicle will find the inside of the trunk well illuminated from the moment the trunk lid is opened. A separate electrical controller is here unnecessary.

In an example for the configuration of the above embodiment, the switching element has a toggle switch, which is pressed down by the end section of the parcel shelf as the latter pivots to a prescribed position. When the trunk lid of the motor vehicle is lifted, the parcel shelf is usually also pivoted around its rotatable mount, so that the end section, which is located at the front viewed in the traveling direction of the vehicle, is downwardly pivoted. Starting at a prescribed position, it there comes into contact with the toggle switch, and presses the latter down. This moves the toggle switch into a closed position, which enables the electrically conductive connection between the at least one lamp and the electrical plug connection. As a consequence, the battery can supply the lamp with electrical energy, and the lighting element is made to light up.

The toggle switch can here be resiliently mounted, so as to automatically be reset to an open position given a lack of contact with the end section of the parcel shelf. As a result, the electrically conductive connection between the at least one lamp and the electrical plug connection is interrupted, and the lamp is turned off, so that no electrical energy is consumed by the lamp with the trunk closed.

BRIEF DESCRIPTION OF THE DRAWINGS

The present disclosure will hereinafter be described in conjunction with the following drawing figures, wherein like numerals denote like elements.

FIG. 1 is a perspective view of a trunk of a motor vehicle, which is equipped with a light bar according to an embodiment of the present disclosure;

FIG. 2a is a side view of the light bar on FIG. 1;

FIG. 2b shows a second end of the light bar on FIG. 2a in a perspective view;

FIG. 2c shows a second end of the light bar on FIG. 2a in in cross section;

FIG. 3a is a detailed view of the trunk on FIG. 1;

FIG. 3b is a view of the light bar on FIG. 1, which illustrates the insertion of the latter into the trunk;

FIG. 4b is a sectional view of the light bar on FIG. 1 along the Y plane of FIG. 4a;

FIG. 5a is another detailed view of the trunk on FIG. 1;

FIG. 5b is a perspective view of the second end of the light bar on FIG. 2a;

FIG. 6a shows a switching element of the light bar on FIG. 1 in the open position; and FIG. 6b shows a switching element of the light bar on FIG. 1 in the closed position.

DETAILED DESCRIPTION

Figure 4A:
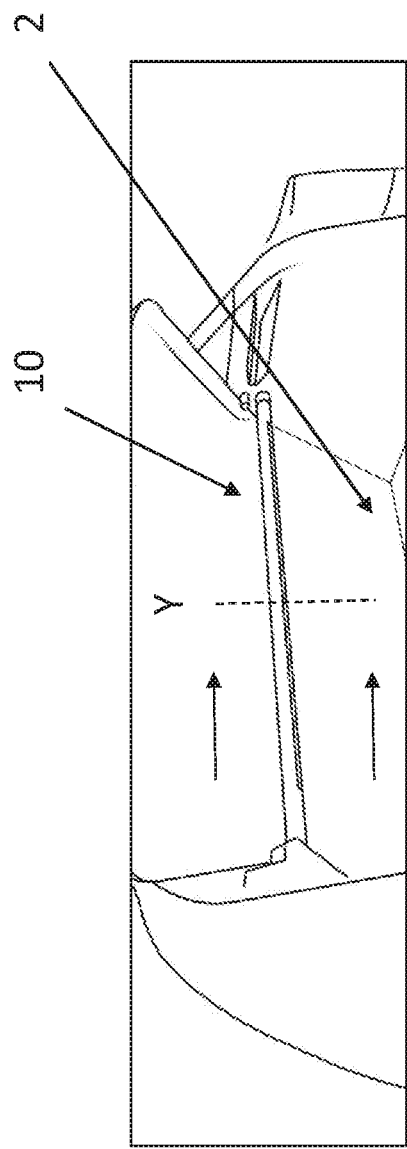
FIG. 4a is another view of the trunk on FIG. 1.

The following detailed description is merely exemplary in nature and is not intended to limit the invention or the application and uses of the invention. Furthermore, there is no intention to be bound by any theory presented in the preceding background of the invention or the following detailed description.

FIG. 1 shows a portion of a motor vehicle labeled with reference number 1 in its entirety. The motor vehicle 1 has a trunk 2, which is equipped with a parcel shelf 3 that upwardly covers the trunk 2 in a closed state. As evident, the parcel shelf 3 is pivoted to a first side wall 4 and a second side wall 5 of the trunk 2. A trunk lid 6 of the motor vehicle 1 is open on FIG. 1, meaning that the parcel shelf 2 connected with the trunk lid (the connection not being shown in detail on the Fig.) is upwardly pivoted. More precisely, the rear area 3a of the parcel shelf 3 located behind a pivoting axis 7 of the parcel shelf 3 (here a pivoting axis fastened to the first side wall 4) is lifted, so that a user can access the inside of the trunk 2.

The inside of the trunk 2 accommodates a light bar 10 according to an embodiment of the present disclosure, below the parcel shelf 3 in the illustration depicted. The light bar 10 is here mounted, i.e., detachably fastened, to the first side wall 4 and to the second side wall 5. Details of the detachable fastening will be explained in even more detail below.

FIG. 2a presents a magnified side view of the light bar 10 shown in FIG. 1. As evident, the light bar 10 includes a tubular element 11, which in the embodiment depicted is straight and symmetrical relative to a longitudinal axis X. Located at a first end 11a of the tubular element 11 shown on the right side of the Fig. is an electrical plug connection 13 for supplying a light bar 12 secured in an interior 11c of the tubular element 11, and for mounting the light bar 10 in the trunk 2 of the motor vehicle 1.

Inserted into a shell surface 11d of the tubular element 11 is a translucent element 11, through which light generated by the lamp 12 secured in the interior 11c of the tubular element 11 can exit toward the outside. The translucent element 14 here extends over about 75% of the length L of the tubular element 11, i.e., over about 75% of the expansion of the tubular element 11 toward the longitudinal axis X. Another area of the trunk 2 can be illuminated in this way. In other embodiments, however, the translucent element 14 can also extend more or less far over the length L of the tubular element 11. For example, an area of between 30% and 90% of the length L of the tubular element is provided as a non-limiting example.

The translucent element 14 can involve a conventional glass pane, which is inserted in a precisely fitting manner into a cutout of the shell surface 11d of the tubular element 11. This prevents contaminants, dust or moisture from penetrating into the interior 11c of the tubular element 11. Also avoided is an inadvertent impact on the lamp 12, which could damage the latter. Another advantage is realized by designing the translucent element 14 like a lens 17. In this case, the light of the lamp 12 can be scattered or focused, depending on the quality of the lens 17, thereby resulting in a specific illumination.

As evident from the illustrations on FIGS. 2b and 2c, a mechanical connector 18 is located at the second end 11b of the tubular element 11 visible on the left side in the illustration on FIG. 2a, and configured for detachably mounting the light bar 10 in the trunk 2 of the motor vehicle 1. The mechanical connector 18 is here assembled out of a pin 19 and spring 20, for example a spiral spring. The pin 19 is here mounted inside of the tubular element 11 in such a way as to outwardly protrude toward the longitudinal axis X at the second end 11b. The pin 19 can also be inwardly pressed against the resistance of the spring 20, so that the spring generates a bias that can lock the pin 19 in a corresponding mount.

In the present embodiment, the light bar 10 further includes a switching element 15, as visible in the illustrations on FIGS. 2a and 2b. The switching element 15 is here designed as a slide switch, and makes it possible to manually turn the lamp 12 on and off as required by a user of the motor vehicle. As also shown on FIG. 2a, a terminal element 16 can optionally be present on the tubular element 11, so as to supply power to additional electrical devices of the user of the motor vehicle, e.g., a mobile phone.

The first end 11a of the tubular element 11 will be described in more detail, now drawing reference to FIGS. 3a and 3b. FIG. 3a once again presents a partial view of the trunk 2 of the motor vehicle 1 shown on FIG. 1. As evident, the pivoting axis 7 for rotatably mounting the parcel shelf 8 is secured to the first side wall 4 of the trunk 2.

Located below the latter is an electrical plug connection 9 in the first side wall 4 of the trunk. The electrical plug connection 9 is complementarily configured to the electrical plug connection 13 of the light bar 10. In the case depicted, the electrical plug connection 13 of the light bar 10 is designed as a male plug at the first end 11a of the tubular element 11, while the electrical plug connection 9 of the first side wall 4 is designed as a socket. Of course, the structural design could be the opposite, with the electrical plug connection 9 being designed as a plug, and the electrical plug connection 13 as a female socket.

The electrical plug connection 9 integrated into the first side wall 4 can be conductively connected with a battery of the motor vehicle 1, so as to provide the electrical voltage required for operating the lamp 12, as well as for supplying power to the terminal element 16. If the light bar 10 is inserted into the trunk 2, the first end 11a of the tubular element 11 with its electrical plug connection 13 is introduced into the electrical plug connection 9 in the direction represented by the thick arrows, and there anchored. This ensures that the light bar 10 is mechanically held, and simultaneously supplied with electrical energy.

Figure 4B:
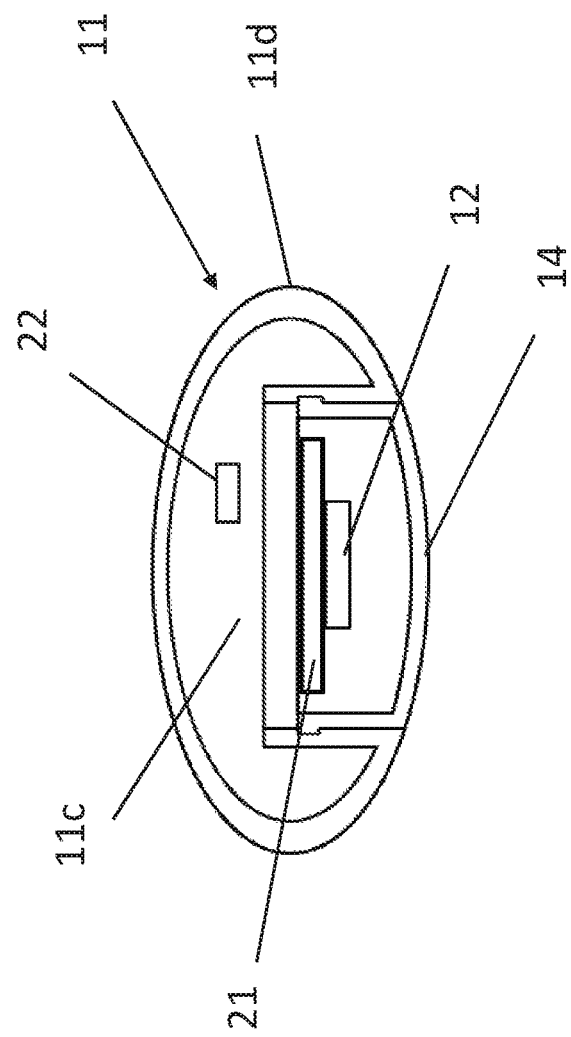

FIG. 4a presents another illustration of the trunk 2, in which a plane marked Y extends perpendicularly through the light bar 10 at the location shown. FIG. 4b presents a sectional view through the light bar 10 along this plane Y. As evident, the tubular element 11 of the light bar 10 has an elliptical cross section, which is enveloped by the shell surface 11d. Located in a lower area is a perforation of the shell surface 11d, which is covered by the translucent element 14. In the interior 11c of the tubular element 11, the lamp 12 is secured above the translucent element 14, and can be a light-emitting diode, for example. The lamp 12 is in contact with a line 21, which leads to the electrical plug connection 13 for supplying electrical energy to the lamp 12.

Also present in the embodiment shown is a rechargeable battery 22, which is here only schematically denoted. Electrical energy can be stored in the rechargeable battery 22, so that the light bar 10 can even be used when not connected with the electrical plug connection 9 of the trunk 2. The light bar 10, which as previously noted is detachably secured in the trunk 2, can thus be removed from the latter, and serve as a portable light source, for example during a picnic outside at night.

FIGS. 5a and 5b illustrate how the second end 11b of the tubular element 11 is secured to the second side wall 5 of the trunk 2. In order to attach the tubular element 11, the pin 19 is pressed into a recess in a projection 23 in the second side wall 5, and is held there by the bias of the spring 20 depicted on FIG. 2c. In this way, a detachable connection of the rod is also created on the second side wall 5.

Now drawing reference to FIGS. 6a and 6b, a special embodiment of a switching element 15 is shown, which is here designed as a toggle switch 24. The switching element 15 shown here can be present alternatively or additionally to the switching element 15 described on FIGS. 2b and 2c.

The toggle switch 24 is a mechanical switching element, which is here actuated by an end section 3b of the parcel shelf 3 of the trunk 2 while it turns around the pivoting axis 7. FIG. 6a shows the parcel shelf 3 in a position which it assumes when the trunk 2 is closed. No force is exerted on the toggle switch 24 from outside in this position, which is why it remains in the open position depicted on FIG. 6a, against which it is elastically biased. In this position of the toggle switch 24, there is no conductive contact between the lamp 12 and electrical plug connection 13 of the light bar 10.

If the trunk lid 6 depicted on FIG. 1 is now opened, the parcel shelf 3 is pivoted around the pivoting axis 7 in the direction shown on FIG. 6b, so that the end section 3b of the parcel shelf 3 comes into contact with the toggle switch 24, and as the parcel shelf 3 continues to turn, presses it down until it reaches a prescribed position in which the toggle switch 24 is closed. In this position depicted on FIG. 6b, the toggle switch 24 releases the conductive connection between the lamp 12 and the electrical plug connection 13 of the light bar 10, so that the latter becomes conductive. This enables current to flow through the lamp 12, and the light bar 10 emits light.

The described construction makes it easy to turn on the lamp automatically when opening the trunk, and turn it off again when closing the latter.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A light bar for a trunk of a motor vehicle comprising:
    a tubular element with a first end having an electrical plug connector and a second end; and
    at least one lamp secured in an inner surface of the tubular element, wherein the electrical plug connector is electrically coupled with the at least one lamp, and the second end of the tubular element comprises a mechanical connector configured to establish a detachable connection.

2. The light bar according to claim 1, wherein the lamp is secured in the interior of the tubular element and a portion of the shell surface of the tubular element comprises a translucent element.

3. The light bar according to claim 2, wherein the translucent element is a lens.

4. The light bar according to claim 1, wherein the lamp is a light-emitting diode.

5. The light bar according to claim 1, wherein the mechanical connector comprises a pin mounted on the tubular element by a spring.

6. The light bar according to claim 1, further comprising a switching element secured to the shell surface of the tubular element and electrically coupled to the lamp for turning the lamp on and off.

7. The light bar according to claim 1, wherein the tubular element has a cross-sectional configuration that is selected from the group consisting of a circular cross-section or an elliptical cross section.

8. The light bar according to claim 1, further comprising a rechargeable battery disposed in the tubular element and electrically coupled to the at least one lamp.

9. A light bar for a trunk of a motor vehicle comprising:
    a tubular element with a first end having an electrical plug connector and a second end;
    at least one lamp secured in an inner surface of the tubular element, wherein the electrical plug connector is electrically coupled with the at least one lamp; and
    at least one electrical connector disposed on a shell surface of the tubular element and connected in an electrically conductive manner with the electrical plug connector.

10. A motor vehicle comprising:
    a trunk with a first side wall and a second side wall and a light bar including a tubular element with a first end having an electrical plug connector and a second end, the light bar including at least one lamp secured in an inner surface of the tubular element,
    wherein the electrical plug connector is electrically coupled with the at least one lamp and the first side wall is provided with an electrical plug connection electrically coupled to a battery and configured to mate with the electrical plug connector of the light bar.

11. The motor vehicle according to claim 10, wherein the light bar further comprises a switching element secured to the shell surface of the tubular element and electrically coupled to the lamp for turning the lamp on and off and the trunk further comprises a parcel shelf rotatably mounted on the first side wall and the second side wall of the trunk for pivoting the parcel shelf such that a first end section of the parcel shelf comes into contact with the switching element to actuate the switching element.

12. The motor vehicle according to claim 11, wherein the switching element comprises a toggle switch which is pressed down to a closed position by the end section when the parcel shelf pivots to a prescribed down position.

13. The motor vehicle according to claim 12, wherein the toggle switch is resiliently mounted so as to automatically reset to an open position when the parcel shelf pivots to a prescribed up position.

* * * * *